Sept. 6, 1966  J. D. GROVES  3,271,132
METHOD AND APPARATUS FOR THE TREATMENT OF ALUMINUM
Filed Nov. 19, 1963
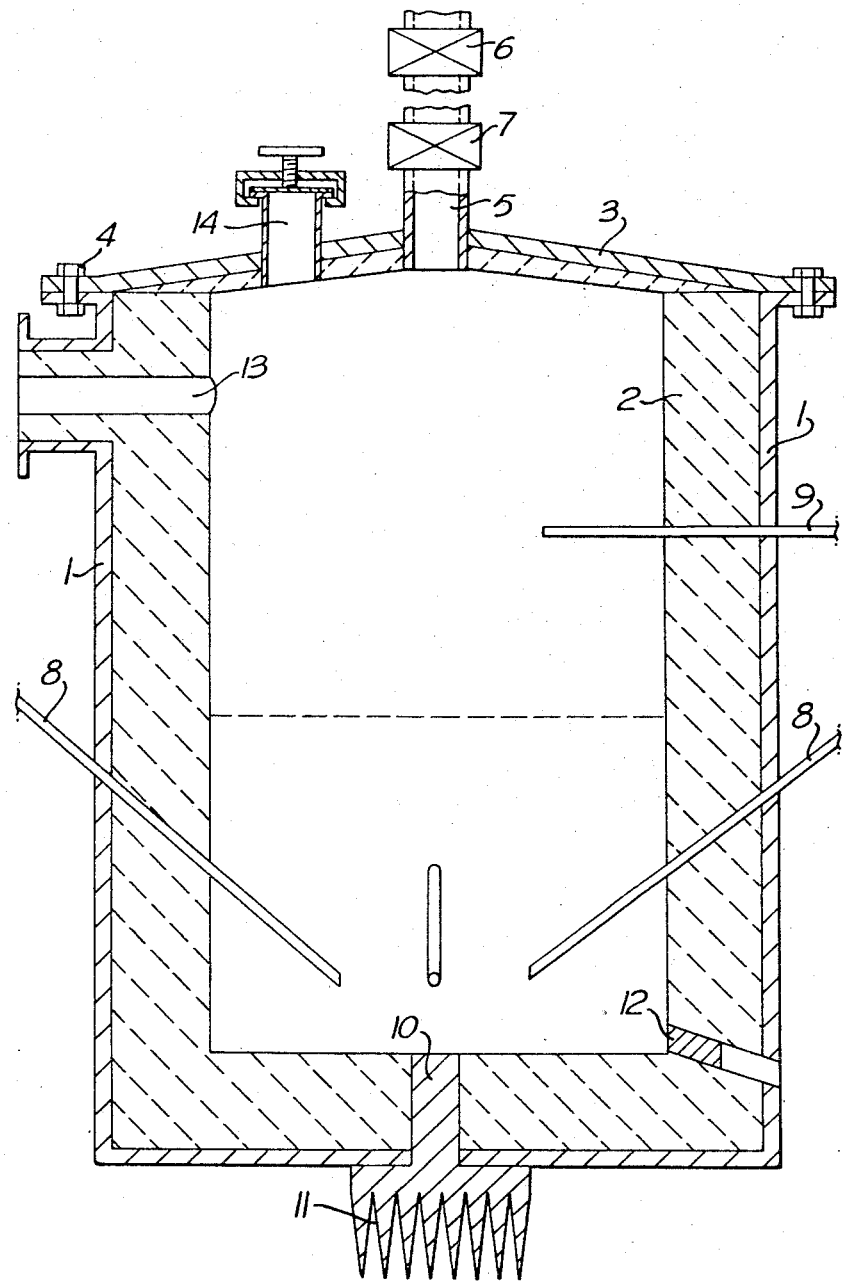

United States Patent Office 3,271,132
Patented Sept. 6, 1966

3,271,132
METHOD AND APPARATUS FOR THE TREATMENT OF ALUMINUM
James Dennis Groves, Stockton-on-Tees, England, assignor to British Titan Products Company Limited, Durham, England, a corporation of the United Kingdom
Filed Nov. 19, 1963, Ser. No. 324,682
Claims priority, application Great Britain, Nov. 21, 1962, 44,019/62
12 Claims. (Cl. 75—68)

The present invention relates to an apparatus for the treatment of molten aluminum and to a method for the use of such apparatus.

The invention is hereinafter described more particularly with reference to the chlorination of molten aluminium but the apparatus is suitable for many purposes where it is desired to dissipate heat from molten aluminum in a container.

The chlorination of aluminium metal by gaseous chlorine is a highly exothermic reaction and it has hitherto proved difficult to dissipate the heat during this reaction since the corrosive materials present (for example molten aluminium, chlorine and aluminium trichloride) necessitate in the apparatus a lining of refractory material, such as ceramic material or concrete. Such materials have poor heat-conducting properties which prevent the ready removal of excess heat from the exterior of the container by conventional means such as a cooling jacket or the like.

It is an object of the present invention to provide apparatus and method whereby heat can be dissipated from molten aluminium in a container.

Accordingly, the present invention in an apparatus suitable for the treatment of molten aluminium comprising a container adapted to contain molten aluminium and, through a wall of the container, a plug of solid aluminium one end of which is so positioned as to be in heat exchange relationship with the molten aluminium within the container when in use, the other end being adapted for heat exchange contact with a cooling fluid. Said container is normally lined with refractory material. Such refractory material should of course be resistant to the action of molten aluminium and have poor heat-conducting properties.

The invention also comprises a method for extracting heat from molten aluminium metal in a container by conducting said heat through an aluminium plug through a wall of said container, the molten aluminium in the container being in heat exchange relationship with the part of the plug inward of the container and a cooling fluid being in heat exchange relationship with the part of the plug outward of the container.

When the apparatus is used in the chlorination of aluminium it is normally provided with at least one inlet for chlorine in the lower part of the container (the main chlorine inlet or inlets preferably being beneath the surface of the molten aluminium) and an outlet in the upper part of the container for the aluminium chloride produced during the chlorination. There is normally also provided means for charging the container with aluminium metal.

The inlets beneath the surface of the molten aluminium desirably have orifices such that the chlorine passing through each orifice suffers a pressure drop which is from 0.25 to 50 times the pressure drop from the orifice to the surface of the molten aluminium, preferably from 0.5 to 5 times such pressure drop. A convenient way of providing the orifice is to fit over the end of the inlet a cap having an orifice of the desired size. The cap should of course be made of a material which resists the action of molten aluminium, e.g. steatite, alumina or thermal zircon. A purpose of such an orifice is to prevent or decrease surging of molten aluminium into the inlets as a result of pressure variattions in the container; with such surging there would be a risk of molten aluminium solidifying in and blocking the inlets.

If desired, there may also be one or more subsidiary chlorine inlets in the upper part of the container (above the surface of the molten aluminium) through which chlorine can be introduced to ensure that any aluminium vapour or lower chlorides of aluminium in the space above the molten aluminium are converted to aluminium trichloride before leaving the container.

In order to prevent condensation of the aluminium trichloride in the outlet and subsequent passages, it may be desirable to heat these, for example by means of electric heating elements, to a temperature above that at which aluminium trichloride condenses.

In the chlorination of aluminium it has been found convenient to form the container from a steel shell lined with about 9 inches thickness of a suitably resistant material such as ceramic material or refractory concrete, for example concrete having a high alumina content.

The cross-sectional area of the plug through the wall of the conttainer is so chosen that the desired amount of heat can be conducted away from the molten aluminium in the container and an acceptable temperature thus maintained within the latter. When chlorinating aluminium a temperature in the range of about 660° C. to 1300° C. and preferably about 700° C. to 900° C. has been found convenient.

The cross-sectional area required to conduct away a given amount of heat can be calculated from the known value of thermal conductivity of the aluminium used or it may be found by trial and error, if desired.

As an alternative method of controlling the temperature in the container, an aluminium plug of fixed size may be used and the rate of flow of chlorine may be controlled. This is not likely to be the preferred method of controlling the temperature since the prime consideration is likely to be the output of aluminium chloride.

It is preferred that the aluminium plug be directly in contact with the molten aluminium, and it is believed that in this case part of the aluminium plug in contact with the molten aluminium melts and this forms an excellent heat transfer contact with the remaining solid portion of the plug.

The part of the plug on the exterior surface of the container is cooled by any desired means, for example the surface area may be extended for example by means of fins, and air may be blown or otherwise circulated over the fins or, alternatively, the surface area may be increased by the provision of external or internal coolant passages and a liquid coolant may be circulated through these.

The plug may be secured in the container by making it of such dimensions that it is a driven fit into the shell and/or lining of the container and thus provides a leak-proof joint. Alternatively, the plug may be threaded and screwed into the wall of the container.

In the chlorination of aluminum it has been found that when the chlorine supply ceases and the aluminum solidifies difficulty is experienced in restarting the process since the chlorine inlets are blocked with solid aluminum. This difficulty may be avoided by cutting off the chlorine and by passing an inert gas, for example argon or nitrogen, through the molten aluminum as it solidifies to form a "honeycomb" structure through which the chlorine will pass on restarting the process. In this case, the chlorine through at least one chlorine inlet should be gradually replaced by the inert gas while a positive pressure is maintained and the flow of the inert gas is continued while the aluminum solidifies, so that the solid aluminum contains at least one passage running through it from at least one chlorine inlet to the surface. If the inert gas is nitrogen, some aluminum nitride is formed; this compound is readily chlorinated and its formation is therefore not a serious disadvantage. Alternatively, another plug, preferably shorter than that used for heat dissipation, may be provided in the bottom of the container and this plug may be cooled, for example by means of an air blast, during the chlorination process to prevent its melting. When the process is to be stopped, cooling of the plug is stopped and the chlorination is continued until the plug melts and thus allows the molten aluminum in the container to run out into a suitable receptable. The plug will be replaced and the container will, of course, be refilled with aluminum when the chlorination is to be recommenced. Small pieces of aluminum may be used to fill the container as this ensures that chlorine can pass readily through the aluminum thus causing reaction and the production of sufficient heat to melt the aluminum. The aluminum in this case may be heated to reaction temperature, for example by means of a gas flame, before the chlorine is introduced. This method has the disadvantage that some oxidation of the aluminum takes place. It is therefore preferred in charging the container to heat a small amount, for example 30 or 40 lbs., of aluminum in a separate vessel to about 300° C., and then to transfer this charge to the container, close up the latter and admit the chlorine. Further quantities of aluminum are added as necessary at intervals, until the container contains its full charge of molten aluminum.

The following examples show methods of carrying out the present invention.

*Example 1*

A container is formed from a steel shell 1 of 33 inches diameter lined with a refractory concrete 2, 9 inches thick and having a removable top 3 similarly lined and secured by bolts 4 to the lower part of the container.

The top 3 of the container is provided with a supply device consisting of a pipe 5 of 3 inches internal diameter having two valves 6 and 7, 46 inches apart along the pipe.

The container is also provided with four chloride inlet pipes 8 of 0.25 inch internal diameter, three of which are supplied from a common manifold (not shown) and the fourth from a separate supply with controlling valve (not shown). The three former inlet pipes terminate about 2 inches above the lining 2 at the bottom of the reactor. The fourth inlet pipe is provided so that the pressure drop of chlorine across the molten aluminum can be determined, thus indicating how much molten aluminum is present in the container. An additional inlet pipe 9 is provided to inject chlorine above the molten aluminum.

In the bottom of the container is an aluminum plug 10 which is of 3½ inches square across section within the wall of the container and which is expanded to 6½ inches square cross section outside the wall of the container. The expanded end is formed into fins 11, the total area of the fins being about 72 square inches, over which air is blown by a fan (not shown). An aluminum drain plug 12 is also provided in the wall of the container and the exterior end of this plug is cooled by an air blast from a compressor (not shown) during the chlorination.

The container is also provided with an outlet 13 for the reaction products.

The container is also provided with a port 14 through which a gas poker may be inserted to heat the contents to reaction temperature.

When the apparatus is to be used, a charge of about 70 lbs. of broken aluminum ingots of a size of about 0.5 inch to 2 inches is introduced through the pipe 5 and this charge is heated by means of a gas poker introduced through the port 14 to a temperature of about 450° C., after which the valves are closed. Chlorine is then introduced through the lower inlet pipes 8 at a total rate of about 2 cubic feet per minute. Chlorine is also introduced through the inlet pipe 9 at a rate of about 0.3 cubic foot per minute.

As the chlorination proceeds the temperature in the container rises and the aluminum melts to provide a molten bath about 33 inches deep. The air blast over the fins 11 is commenced. The temperature of the molten aluminum in the container is normally maintained at about 900° C. during the chlorination by means of the present invention.

When further aluminum is to be introduced into the container during chlorination it is placed in the pipe 5 and the upper valve 6 is opened to allow the aluminum to pass into the part of the pipe 5 which lies between the valves 6 and 7. The upper valve 6 is then closed and the lower valve 7 opened, thus allowing the aluminum to pass into the container without escape of chlorine or aluminum trichloride to the atmosphere.

Under the conditions described the apparatus is capable of producing about 30 lbs. of aluminum trichloride per hour and the temperature of the molten aluminum is readily controlled.

*Example 2*

The apparatus is similar to that described in Example 1 except that the chlorine inlet pipes 8 are provided with steatite caps through which are drilled orifices of 3/32" diameter.

A charge of 40 lbs. of aluminium which has been heated to a temperature of 300° C. in a separate vessel is dropped into the chlorinator and the latter is closed and chlorine admitted as described in Example 1. A further 10 lbs. of aluminium pellets are added every 15 minutes until the chlorinator contains 140 lbs. of aluminium. The rate of addition of aluminium is then reduced to 6 lbs. per hour.

The airflow over the fins 11 is maintained at such a rate as to control the temperature of the aluminium in the range 750° C. to 800° C. and the temperature of the plug 12 is maintained below 350° C. by directing upon it an independent air stream.

The process proceeds smoothly for about 11 hours during which time it produces about 30 lbs. per hour of pure aluminium trichloride. The air stream upon the small plug 12 is then discontinued and the plug melts allowing the molten aluminium to run from the container.

What is claimed is:

1. In an apparatus for the treatment of molten aluminium, which apparatus comprises a container for said molten aluminium having a lining of a refractory, corrosion-resistant material of relatively poor heat-conducting properties, the improvement comprising a plug of solid aluminium passing through a wall of said container and through said lining, the interior end of said plug adapted to be in direct heat exchange contact with contained molten aluminium, and the exterior end of said plug having a substantially expanded cross sectional area adapted for direct heat exchange with a fluid, and means associated with the exterior end of said plug for passing a heat exchange fluid into direct, intimate contact therewith, said means adapted to remove heat from said exterior end of said plug at a rate greater than the minium rate necessary to maintain said plug substantially unmelted when the interior end of said plug is in contact with contained molten aluminium.

2. An apparatus in accordance with claim 1, comprising in addition, a second aluminium plug passing through the bottom of said container and through said lining, the interior end of said plug adapted to be in direct heat exchange contact with contained molten aluminium and the exterior end of said second plug adapted for direct heat exchange with a fluid and means associated with said exterior end of said second plug for passing a cooling fluid into direct, intimate contact therewith, said means adapted to prevent substantial melting of said second plug when the interior end of said plug is in contact with contained molten aluminium.

3. An apparatus according to claim 1, specifically adapted for the chlorination of molten aluminium and having at least one chlorine inlet in the lower part of the container adapted to discharge into said container at a point below the surface of contained molten aluminium and an aluminium chloride vapour outlet in the upper part of the container adapted to withdraw aluminium chloride vapor from said container at a point above the surface of contained molten aluminium, the inlet having an orifice such that chlorine passing through it will suffer a pressure drop from 0.25 to 50 times the pressure drop between the orifice and the surface of contained molten aluminium.

4. An apparatus according to claim 3, in which the stated pressure drop is from 0.5 to 5 times the pressure drop between the orifice and the surface of the molten aluminium.

5. An apparatus according to claim 3, comprising at least one subsidiary chlorine inlet in the upper part of the container above the surface of contained molten aluminium adapted to introduce chlorine into intimate, reactive contact with vaporous aluminium material in the space above contained molten aluminium.

6. A process for extracting heat from molten aluminium contained in a container having a refractory, corrosion-resistant lining of relatively poor heat-conducting properties which process comprises the steps of (a) passing a solid aluminium plug through a wall of said container and through said refractory lining and into intimate contact with said contained molten aluminium, said aluminium plug characterized by an end portion exterior to said container of substantially expanded cross sectional area, (b) passing a cooling fluid into direct, intimate contact with said expanded portion of said plug to effect substantial withdrawal of heat from said contained molten aluminium through said aluminium plug, and (c) maintaining the flow of said cooling fluid across said expanded portion of said plug at a rate sufficient to maintain the withdrawal of heat from said molten aluminium and to maintain said plug substantially intact.

7. A process for the production of aluminium chloride by reaction of gaseous chlorine with molten aluminium in a reactor having a refractory, corrosion-resistant lining of relatively poor heat-conducting properties, said reactor provided with an aluminium plug passing through a wall of said reactor and through said lining into direct heat exchange contact with the contained molten aluminium and having an exterior end portion of substantially expanded cross sectional area comprising the steps of (a) introducing gaseous chlorine into said molten aluminium beneath the surface thereof with a pressure drop in the range of 0.25 to 50 times the pressure drop between the point of chlorine introduction and said surface of said molten aluminium, (b) reacting said chlorine and said molten aluminium to form aluminium chloride vapor, (c) recovering aluminium chloride from the vapor space above said surface of said molten aluminium, (d) passing a cooling fluid into direct, intimate contact with said expanded exterior portion of said aluminium plug to effect substantial withdrawal of heat from said contained molten aluminium through said aluminium plug, and (e) maintaining the flow of said cooling fluid across said expanded portion of said plug at a rate sufficient to maintain said plug substantially intact and to withdraw at least a major portion of the heat of reaction from said reactor.

8. A process according to claim 7, in which the incoming chlorine pressure drop is from 0.5 to 5 times the pressure drop between said point of chlorine introduction and said surface.

9. A process according to claim 7, in which chlorine is additionally admitted into the reactor above the surface of the molten aluminium so as to convert to aluminium trichloride other vaporous aluminium material.

10. A process in accordance with claim 7 in which said reactor is charged by heating a portion of the aluminium to at least 300° C., transferring said portion to a container and admitting chlorine into said portion in the container, and repeating these steps until the container contains a complete charge of molten aluminium.

11. A process according to claim 7, wherein the reaction is terminated by gradually replacing the flow of chlorine from a subsurface inlet through the molten aluminium by a flow of an inert gas while maintaining a positive pressure through the inlet, and continuing the flow of the inert gas while the aluminium solidifies so that the solid aluminium contains at least one empty passage running through it from at least one chlorine inlet to the surface of the aluminium.

12. A process according to claim 7, in which said reactor is provided with a second fusible plug passing through the bottom of said reactor, said fusible plug maintained solid by direct heat transfer contact with a cooling fluid, said process comprising the additional step of terminating the cooling of said second fusible plug whereby the fusible plug melts and allows the molten aluminium in the reactor to run out.

References Cited by the Examiner

UNITED STATES PATENTS

| | | | |
|---|---|---|---|
| 2,091,981 | 9/1937 | Hanson | 75—93 X |
| 2,625,472 | 1/1953 | Scheuer | 75—68 |
| 2,763,480 | 9/1956 | Keller et al. | 266—42 |
| 2,847,204 | 8/1958 | Hnilicka | 266—34 |
| 3,014,255 | 12/1961 | Bussard et al. | 266—42 X |
| 3,234,008 | 2/1966 | Johnson | 75—68 X |

OTHER REFERENCES

Halme, P. M.: Fluxing Molten Aluminum With Dry Nitrogen, Materials and Methods, November 1945, pp. 1435–1438.

DAVID L. RECK, *Primary Examiner.*

H. W. TARRING, *Assistant Examiner.*